United States Patent
Sufian et al.

(10) Patent No.: US 9,692,900 B1
(45) Date of Patent: Jun. 27, 2017

(54) STRATEGIC INTELLIGENT DECISION ENGINE

(75) Inventors: Sammy Sufian, Omaha, NE (US);
Kevin Welch, Bennington, NE (US);
Benjamin Foster Matthews, Omaha, NE (US); Steve Hervey, Plattsmouth, NE (US); Stephanie Stokes, Bellevue, NE (US)

(73) Assignee: WEST CORPORATION, Omaha, NE (US)

( * ) Notice: Subject to any disclaimer, the term of this patent is extended or adjusted under 35 U.S.C. 154(b) by 668 days.

(21) Appl. No.: 13/443,071

(22) Filed: Apr. 10, 2012

(51) Int. Cl.
*H04M 3/523* (2006.01)

(52) U.S. Cl.
CPC .................................. *H04M 3/5233* (2013.01)

(58) Field of Classification Search
CPC .................................................. H04M 3/5233

USPC .............. 379/114.14, 218.02, 265.01–266.1, 379/220.01; 705/14.13, 38, 36 R; 704/231

See application file for complete search history.

(56) References Cited

U.S. PATENT DOCUMENTS

| | | | |
|---|---|---|---|
| 6,560,330 B2 * | 5/2003 | Gabriel | 379/265.02 |
| 8,738,516 B1 * | 5/2014 | Dean et al. | 705/38 |
| 2003/0059023 A1 * | 3/2003 | Crockett | H04Q 3/0029 379/220.01 |
| 2005/0267748 A1 * | 12/2005 | Wilkes et al. | 704/231 |
| 2010/0241501 A1 * | 9/2010 | Marshall | 705/14.13 |
| 2011/0022541 A1 * | 1/2011 | Miles | G06Q 40/00 705/36 R |

* cited by examiner

*Primary Examiner* — Md S Elahee
(74) *Attorney, Agent, or Firm* — Raffi Gostanian

(57) ABSTRACT

One or more embodiments of the present invention pertains to an apparatus and method that detects a condition of the customer when an incoming call is received from a customer and directs or transfers the customer to an agent to service the customer based on the detected condition.

20 Claims, 9 Drawing Sheets

STRATEGIC INTELLIGENT DECISION ENGINE

FIELD

The present invention relates to interactive voice response (IVR) systems and, more particularly, to controlling and configuring interactive voice response functionality through a secure interface.

BACKGROUND

IVR systems use business logic integration platforms, such as Drools®. For example, Drools® provides the system owner with a development editor, which is used to create instances of rules using raw code. However, in order to create and configure intelligent decisions on the fly using Drools®, a certain level of technical knowledge and training is required.

SUMMARY

Certain embodiments of the present invention may provide solutions to the problems and needs in the art that have not yet been fully identified, appreciated, or solved by business logic integration platforms.

In accordance with an embodiment of the present invention, a method is provided. The method includes receiving an incoming call from a consumer at an interactive voice response system and determining an action based on the available metrics.

In yet another embodiment of the present invention, an apparatus is provided. The apparatus includes a processor and memory having instructions stored thereon. The instructions are configured to cause the processor to receive an incoming call from a consumer at an interactive voice response system and determine an action based on the available metrics.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
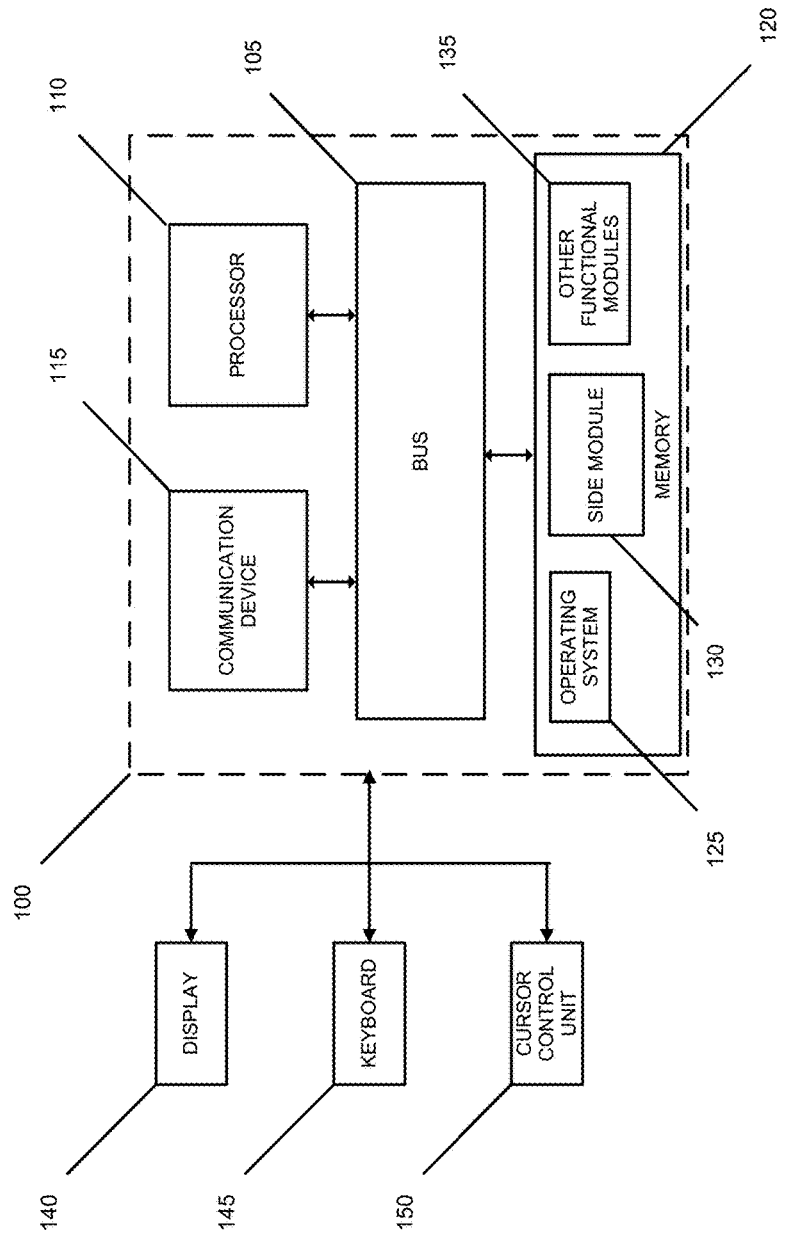
FIG. 1 illustrates a block diagram of a system, in accordance with an embodiment of the present invention.

It will be readily understood that the components of the invention, as generally described and illustrated in the figures herein, may be arranged and designed in a wide variety of different configurations. Thus, the following detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

One or more embodiments of the present invention pertain to a system that can control and/or configure IVR functionality through a secure interface. For example, the strategic intelligent decision engine (SIDE) can provide the following functionality to a client: (1) Alarms and Filters Engine, (2) Triage Engine, (3) Strategy Engine, and (4) Transfer Override Engine.

The Alarms and Filters Engine can capture customers who are classified under a "bad status" for various reasons, such as fraud, delinquency, abusive callers, etc., and route these callers to a specific agent destination, denying such callers the ability to perform self-service actions within the IVR system. The interface of the system can also allow the owner of the system to configure any and all data elements to analyze and configure the exact transfer vectors to route the customer based on the decision that was triggered.

The Triage Engine has the ability to capture customers and appropriately group them into the appropriate line of business (LOB) based on a variation of statuses and consumer-level data elements, which would ultimately drive the flow of the call. The LOB can be an available data point for consumption within the remainder of the call. The interface allows the system owner to configure any and all data elements to analyze and capture the LOB that the caller should be grouped under based on the decision that was triggered.

The Strategy Engine has the ability to provide dynamic menu options. For example, consumer-level and account-level data elements are analyzed to generate a set of self-service menu options that best address the customer's needs. As a result, a more personalized and intuitive IVR experience is presented.

The Transfer Override Engine has the ability to intelligently route the callers to customer service agents that will assist them with their immediate needs. The system can identify the intent of the customer, along with various consumer-level and account-level data elements, and can route the customer to the appropriate end-point. The interface also allows the system owner to configure any and all data elements to analyze as well as configure the exact transfer vectors to route the customer based on the decision that was triggered.

The above-mentioned functionality can be data-driven and customizable through an integrated web-interface and, although each of these engines may produce different results, they can essentially be the same engine, sharing the same overall decision engine architecture in some embodiments.

FIG. 1 illustrates a block diagram of a system 100, in accordance with an embodiment of the present invention. System 100 may include a bus 105 or other communication mechanism that can communicate information and a processor 110, coupled to bus 105, that can process information. Processor 110 can be any type of general or specific purpose processor. System 100 may also include memory 120 that can store information and instructions to be executed by processor 110. Memory 120 can be comprised of any combination of random access memory ("RAM"), read only memory ("ROM"), static storage such as a magnetic or optical disk, or any other type of computer readable medium. System 100 may also include a communication device 115, such as a network interface card, that may provide access to a network.

The computer readable medium may be any available media that can be accessed by processor 110. The computer readable medium may include both volatile and nonvolatile medium, removable and non-removable media, and communication media. The communication media may include computer readable instructions, data structures, program modules, or other data and may include any information delivery media.

Processor 110 can also be coupled via bus 105 to a display 140, such as a Liquid Crystal Display ("LCD"). Display 140 may display information to the user. A keyboard 145 and a cursor control unit 150, such as a computer mouse, may also be coupled to bus 105 to enable the user to interface with system 100.

According to one embodiment, memory 120 may store software modules that may provide functionality when executed by processor 110. The modules can include an operating system 125 and a SIDE module 130, as well as other functional modules 135. Operating system 125 may provide operating system functionality for system 100. Because system 100 may be part of a larger system, SIDE module 130 may include one or more additional functional modules 135 that include the additional functionality. For example, the one or more additional functional modules 135 are Alarms and Filters module, a Triage module, a Strategy module, and a Transfer Override module, among others. SIDE module 130 can be configured to carry out the functionality of the Alarms and Filters module, a Triage module, a Strategy module, and a Transfer Override module.

One skilled in the art will appreciate that a "system" could be embodied as a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

SIDE Module 130

SIDE module 130 may allow a user to perform certain actions based on the user's permissions. For example, once the user logs into system 100, a menu option may be displayed to the user. The menu may include a list of options based on the user's permissions. The list may include a Views feature, an Hours feature, a Toggles feature, and a User feature, for example. Under the Views feature, the following options are available in some embodiments: Alarms and Filters, Triage, Strategy Engine, Master Transfer, Override, Tier Configuration, DNIS Configuration, etc. Under the Hours feature, the following options are available in some embodiments: Hours of Operation, Holiday Exceptions, Custom Exceptions, etc. The Toggles feature may include a Toggle editor option and the User feature may include user admin, change password, and logout options.

The user may be able to view the aforementioned items in the menu by sorting columns in ascending or descending order by selecting the column header. The user may also be able to activate a drop down menu for sorting and removing columns from view by selecting a column header.

In this embodiment, SIDE module 130 allows the user to create new and enabling attributes for alarm, triage, strategy, and override. First, the user selects whether they want to create a new alarm, triage, strategy, or override function. Based on the selection, the user can enter the details and selects the attributes. In order to edit the attribute values, the user can select edit attribute values and may then start editing the selected attributes. The user can also enable a rule, strategy, etc.

In this embodiment, to create a new alarm, the user first selects the feature "New Alarm" to add a new rule and enters the alarm description, a primary skill, a secondary skill, a channel, the priority of the rule, and the attributes applicable to the rule. The primary skill can include Skip (LAD Acceptance), Tier File, Collection Agency Table, and Guarantor Table. Channels may include Department of Education, SLS, and SVC. It should be appreciated that rules may have the same priority as long as they are on different channels.

SIDE module 130 also allows the user to edit attributes of an alarm, delete an alarm, and rollback a rule for an alarm. For example, the rollback feature may revert the rule to a previous rule that was set for a particular alarm.

In this embodiment, to create a new Triage, the user first selects the feature "new triage." The user can then enter a triage description that may have up to 45 characters. In other embodiments, the description may be more or less than 45 characters. The user also sets a channel, such as DOE, SLS, or SVS, that the rule associated with the new triage is changing to. The user can also enter a triage action and a channel that the rule will trigger. The user may also set a priority level and the attributes associated with the triage. SIDE module 130 may also allow the user to edit, delete, or rollback triage.

To create a new strategy, SIDE module 130 may enable the user to select the feature "new strategy". Once selected, in this embodiment, the user enters a description of approximately, but not limited to, 51 characters (the number of characters is not limited by this disclosure), and selects a first information message and a second information message from a drop down menu. The second information message may be optional. The user also sets the channel to DOE, SLS, or SVC. The user has the option to set the strategy to champion or challenger and to set the priority level. The user can also set the attributes that are applicable to the created strategy. SIDE module 130 can also allow the user to edit the attribute values, the strategy, delete the strategy, or rollback the rule of the strategy.

The Master Transfer functionality in SIDE module 130 allows the user to set the dialed number identification service (DNIS), the channel, the default skill, the champion or challenger strategy rule, the greeting related to the DNIS, and to select whether the DNIS should be in the default menu.

To create a new DNIS, the user can select the feature "new DNIS", and enter the following information: DNIS, DNIS type (e.g., R for return or N for new), default skill, percentage of calls for the champion strategy to be applied, the appropriate greeting, etc. It should be appreciated that, once the new DNIS is created, all fields can be edited via the Master Transfer page except for the DNIS field. SIDE module 130 allows the user to edit the default menu associated with the DNIS feature, rollback changes, and delete the DNIS.

In this embodiment, the Override feature in SIDE module 130 allows the user to override any and all destination out of the application by examining a set of consumer-level attributes as well as loan-level attributes. The user may also create a "new override" by entering the override description, the primary skill, the channel, the transfer message, the priority level, and the attributes associated to the applicable strategy. In one or more embodiments, the override may be edited, the attribute value may be edited, the override may be deleted, or the rule may be rolled back to the last known setting.

In this embodiment, the Tier Configuration feature in SIDE module 130 assigns all customers to a Tier based on a Tier matrix. To configure a Tier, a Tier is selected in order to direct all callers in the selected Tier. For example, by selecting Tier 3, all callers in Tiers 1, 2, and 3 can be sent to an agent, while callers in Tiers 4 and 5 may be directed to another agent or destination.

In this embodiment, the DNIS Routing feature in SIDE module 130 allows calls coming into the Student Loans IVR application to arrive through a DNIS (e.g., VDN and/or APN). The DNIS can be a 5 digit numeric value to identify a source of the call. Calls coming into the IVR application can be new or return-from-representative calls. The DNIS can serve as a unique primary key to the Special DNIS Route database. For instance, all incoming DNIS values can be run through the Special DNIS Route database to determine the following elements: Call Classification (New Call or Return Call) and IVR Module access for the DNIS.

The Student Loans IVR application can be broken into several logical organized modules, such as welcome slot, language prompt, global messaging, SSN look up (includes authentication), re-assign CRID, account message, account info lookup, alarms and filters, fast track, triage, etc.

At the beginning of each module, a checkpoint can examine the DNIS's access to the particular module. If the DNIS has access, then the DNIS can enter the module, otherwise, the DNIS can proceed to the next module outlined by the call flow. This allows new and existing DNIS values to have the option to follow the normal full call path or be selective about which patch the call should take, providing for a generous degree of call path customization by DNIS. This can be done by selecting the module to engage for the DNIS.

The Hours of Operation feature in SIDE module 130 may show the display name, day of the week, open and close time. The hours can be in Eastern Standard Time, Pacific Standard Time, or any other desired time zone.

To add hours, the user can select insert hours and then enter the skill number, select the day of the week, the time open and the time closed. It should be appreciated that if the entered skill exists, then the matching numbers may populate automatically. Otherwise, the skill will be added to the database. In other embodiments, the hours of operation can be edited and deleted.

The Holiday Exceptions feature in SIDE Module 130 may create exceptions to the Hours of Operation for a specific holiday. To add a holiday exception, a user selects "date" from a drop down menu. If the holiday is not listed, the user selects to "add date". The user then enters the display name, and the open and closed times. If the open and closed times are left blank, then the system may assume that the corporation or other entity that is running the application is closed all day, for example.

To add hours, a holiday from the drop down menu can be selected and, as a result, all hours added for that holiday are shown. The user can then select the display name, and select the open and closed times. If the open and closed times are left blank, then the system may assume that the corporation or other entity that is running the application is closed all day, for example.

The Hours of Operation feature may also allow the user to edit and delete hours of operation. It should be appreciated that custom exceptions can be created to the Hours of Operation in a similar manner as in the Holiday Exception feature.

The Toggle Editor in SIDE module 130 may allow a user to create a new Survey or Global Messaging Toggles. The Toggle Editor also allows the user to change the existing Toggle values by clicking on the value column and selecting the new value.

In this embodiment, to setup a Survey Toggle, the user adds a Toggle with IVR name set with the following naming convention 'Extention'_surveyVDN, and adds name and values (Y or N). The value names are subject to the SLM description.

To setup Global Messaging Toggles, the user may add a Toggle with an IVR name set having the following naming convention 'DNIS'_Voice and add the name and values. The names may be subject to the SLM description and the values are the voice slot name of the broadcast message found in the current script document.

To setup a Toggle, the user may add a Toggle with IVR name set with the following naming convention 'DNIS'_Toggle and add name and value. The names may be subject to the SLM description and the values can be on, off, transfer, or close, for instance.

The User Admin feature in SIDE module 130 may allow the user to add a new user by entering the user name, the password for the new user, the user's email, the user's status, and the expiration. In some embodiments, the User Admin feature allows the role and permissions of the user to be setup or modified.

Roles define groups of permissions. Generally, most access levels would already be defined under roles. Permissions allow for granular access levels. In addition, permissions can be selected independent of a role to grant singular authorization. Having both roles and permissions results in total authorization for a user.

When a specific channel within a view is selected, the user can only view, setup, and/or modify the specific channel. The available channels may be SVC, DOE, and SLS. It should be appreciated that the user's role and permission levels can be expanded or reduced. Also, the user's information can be modified and the user's password can be reset. The user also has the ability to change his or her password.

Below is a description of the Alarms and Filters module, a Triage module, a Strategy module, and a Transfer Override module. While the modules described below be configured to function independently, SIDE module 130 can be configured to carry out the functionality of the Alarms and Filters module, a Triage module, a Strategy module, and a Transfer Override module.

Alarms and Filters Module

The Alarms and Filters Module may be the first module that is encountered in the Loans IVR call flow. The purpose of the Alarms and Filters Module is to catch callers with specific consumer-level or loan-level conditions and direct them to an agent that will service their needs. This engine is intended to direct certain callers out of the IVR and to a service agent.

For example, the Alarms and Filters Engine can examine a collection of 29 distinct consumer-level and loan-level attributes. See Table 1 below. However, it should be appreciated that there may be more or less than 29 distinct consumer-level and loan-level attributes.

TABLE 1

| Identifier | Variable/Attribute | Identification Point in Flow | Attribute Level |
|---|---|---|---|
| 16 | Fraud Flag | Alarms/Filters | Consumer |
| 17 | Home Phone | Alarms/Filters | Consumer |
| 18 | Business Phone | Alarms/Filters | Consumer |
| 19 | Cell Phone | Alarms/Filters | Consumer |
| 36 | Ed Flag | Alarms/Filters | Consumer |
| 37 | Litigation Flag | Alarms/Filters | Consumer |
| 54 | Current Status Code | Alarms/Filters | Loan |
| 64 | CLAIM IND Field | Alarms/Filters | Loan |
| 65 | CLAIM TYPE Field | Alarms/Filters | Loan |
| 66 | Active Priority Account Indicator | Alarms/Filters | Consumer |
| 69 | Route Consumer Flag | Alarms/Filters | Loan |
| 70 | Loan Program(S) | Alarms/Filters | Loan |
| 71 | Loan Product | Alarms/Filters | Loan |
| 88 | CTA Triggers | Alarms/Filters | Loan |
| 95 | Guarantor Code | Alarms/Filters | Loan |
| 96 | Disability Indicator | Alarms/Filters | Consumer |
| 97 | Valid ADDR | Alarms/Filters | Consumer |
| 98 | Tran Code | Alarms/Filters | Loan |
| 99 | Days Delinquent | Alarms/Filters | Loan |
| 100 | Valid Phone | Alarms/Filters | Consumer |
| 103 | Loan Curable/Incurable Flag | Alarms/Filters | Loan |
| 105 | Loan ID Field | Alarms/Filters | Loan |
| 106 | Collection Agency ID | Alarms/Filters | Loan |
| 107 | Lender Code | Alarms/Filters | Loan |
| 108 | Previous Lender Code | Alarms/Filters | Loan |
| 115 | Consumer Loan Role | Alarms/Filters | Consumer |
| 118 | Commercial Flag | Alarms/Filters | Consumer |
| 124 | Pending Strata Field Variable | Alarms/Filters | Consumer |
| 135 | Score File Check | Alarms/Filters | Consumer |

It should be appreciated that one or more of these attributes may be grouped together to create a "rule", which may be a feature available through the web-based user interface. A field labeled "Alarm Description" could be used to uniquely identify an alarm.

Furthermore, each rule can have an associated transfer skill and each rule can be prioritized by importance, with priority number "1" having the highest possible priority in some embodiments. At the time of the call, a caller's consumer-level and loan-level information are compared to the rules created by the business units. If a rule matches, then the caller is transferred to the destination dictated by the rule. At the time rules are evaluated, rules associated with the incoming channel are examined and evaluated. This indicates that not all rules are evaluated when the caller enters the module, but rather rules applicable to the channel set for the caller are evaluated.

When evaluating attributes, any attributes that have values set in the GUI for a particular rule can be evaluated. If an attribute does not have a set value, then the attribute is disregarded and is not evaluated as being part of the rule. Evaluation of attributes for a rule is considered mandatory when the rule is set. If there is a situation where a rule needs to examine one attribute OR another, each OR condition across the attributes may need to be split into separate rules. For example: If Fraud_Flag=X OR ED_Flag=N, each attribute may need to be split up into two distinct rules:

Rule 1: If Fraud_Flag=X

Rule 2: If Ed_Flag=N

For example, the following three rules can be created through the graphic user interface (GUI) provided by system 100.

TABLE 2

| RULE ID | CHANNEL | FRAUD_FLAG | ED_FLAG | CURRENT_STATUS | PRIORITY | SKILL |
|---|---|---|---|---|---|---|
| 1 | DOE | X | A | L | 1 | 23459 |
|   |     | Y | B | M |   |       |
|   |     | Z | C | N |   |       |
| 2 | DOE | Y | B |   | 2 | 78955 |
|   |     | Z |   |   |   |       |
| 3 | DOE | Z |   |   | 3 | 88774 |

RULE ID 1: For the "DOE" channel, if the caller has values (X,Y,Z) for the FRAUD_FLAG, values (A,B,C) for the ED_FLAG, and values (L,M,N) for the CURRENT_STATUS, then the caller is transferred to SKILL 23459 when the RULE ID has the highest priority and SKILL 23459 is currently operating within designated business hours.

RULE ID 2: For the "DOE" channel, if the caller has values (Y,Z) for the FRAUD_FLAG and value (B) for the ED_FLAG, then the caller is transferred to SKILL 78955 when the RULE ID has the highest priority and SKILL 78955 is currently operating within designated business hours.

RULE ID 3—For the "DOE" channel, if the caller has value (Z) for the FRAUD_FLAG, then the caller is transferred to SKILL 88774 when the RULE ID has the highest priority and SKILL 88774 is currently operating within designated business hours.

EXAMPLE 1

In this example, a caller with the following information may call the IVR:

| CHANNEL = | DOE |
|---|---|
| FRAUD_FLAG = | Z |
| ED_FLAG = | B |
| CURRENT_STATUS = | L |

Because the information matches with all of the RULE IDs in Table 2, the Alarm and Engine Module returns the RULE ID with the highest priority. Since RULE ID 1 has the highest priority, and assuming the caller is calling the IVR during business hours, the caller would be transferred to 23459.

EXAMPLE 2

In this example, a caller with the following information may call the IVR.

| CHANNEL = | DOE |
|---|---|
| FRAUD_FLAG = | Z |
| ED_FLAG = | B |
| CURRENT_STATUS = | J |

Because the information matches with RULE ID 2 and RULE ID 3 in Table 2, and because RULE ID 2 has the higher priority, the caller would be transferred to skill 78955, assuming the caller is calling the IVR during business hours.

EXAMPLE 3

| CHANNEL = | DOE |
|---|---|
| FRAUD_FLAG = | Z |
| ED_FLAG = | R |
| CURRENT_STATUS = | J |

Because the information matches with RULE ID 3 in Table 2, the caller would be transferred to skill 8874, assuming the caller is calling the IVR during business hours.

The Alarms and Filters Module can also utilize other secondary lookup tables to determine routing destinations for specific scenarios. These lookup tables can be: Collections Agency Matrix, Scores File and Guarantor Code Matrix, for instance. The examples described below demonstrate the use of each of the aforementioned lookup tables.

From the GUI, instead of returning a "skill" for a matched rule, a value of "D" can be populated in the "Primary Skill" field, indicating that an additional lookup to the Delinquency Matrix is made in order to determine where to route the caller (see Table 3 below).

TABLE 3

| RULE ID | CHANNEL | FRAUD_FLAG | ED_FLAG | CURRENT_STATUS | PRIORITY | SKILL |
|---|---|---|---|---|---|---|
| 11 | DOE | X | A | L | 1 | D |
|    |     | Y | B | M |   |   |

The Scores File is used for tier routing. If a rule matches and has a primary skill of "T", then a secondary lookup may be performed to the Scores File to determine where to route the caller. For this rule, one attribute—"Tier Lookup"—can be set from the graphical user interface (GUI). This flag has possible values of "Y or N." If the value is set to "Y", then the Scores File is evaluated. Evaluation of the Scores File includes going through each score and comparing each value to a threshold. The first score that has a value equal to or less than the threshold is considered a match and the respective skill for that score is used as the transfer destination (see Table 4 below).

TABLE 4

| RULE ID | CHANNEL | FRAUD_FLAG | ED_FLAG | CURRENT_STATUS | TIER LOOKUP | PRIORITY | SKILL |
|---|---|---|---|---|---|---|---|
| 62 | DOE | | | | Y | 62 | T |

Similar to the previous scenarios, if a rule matches and has a primary skill of "G", then a secondary lookup may be performed to the Guarantor Code File to determine where to route the caller (see Table 5 below).

TABLE 5

| RULE ID | CHANNEL | FRAUD_FLAG | ED_FLAG | CURRENT_STATUS | PRIORITY | SKILL |
|---|---|---|---|---|---|---|
| 23 | DOE | X Y | A | L | 23 | G |

This is used for instances where we do not want a customer transferring to an agent based on certain alarms, and would rather keep them in the IVR for self-service. An example of this instance is an incomplete loan application, where a priority of 1 is placed with this rule and the primary skill is to 'S' to indicate bypassing Alarms and Filters straight to Triage (see Table 6 below).

TABLE 6

| RULE ID | CHANNEL | FRAUD_FLAG | ED_FLAG | CURRENT_STATUS | TIER LOOKUP | PRIORITY | SKILL |
|---|---|---|---|---|---|---|---|
| 1 | DOE | | | | Y | 62 | S |

Also from the GUI, instead of returning a "skill" for a matched rule, a value of "C" can be populated in the "Primary Skill" field, indicating that an additional lookup to the Delinquency Matrix must be made in order to determine where to route the caller (see Table 7 below).

TABLE 7

| RULE ID | CHANNEL | FRAUD_FLAG | ED_FLAG | CURRENT_STATUS | TIER LOOKUP | PRIORITY | SKILL |
|---|---|---|---|---|---|---|---|
| 1 | DOE | | | | Y | 62 | C |

Triage Module

The Triage Module can determine the reason the caller is calling into the IVR. The Triage Module can be broken up into two distinct categories: Non-Verbal Triage and Verbal Triage. Non-Verbal Triage examines the customer's consumer-level attributes and loan-level attributes and determines which channel to set, as well as where to direct the caller (e.g., the caller can be directed to a submenu or to the Strategy Engine). Verbal Triage examines the caller's profile and relies on further prompting the caller for additional information, before a determination can be made regarding how to handle the caller. In some embodiments, there may be 69 Non-Verbal Triage rules that can be examined, as well as 3 Verbal Triage rules. In some embodiments, the Non-Verbal Triage rules have a higher priority than the Verbal Triage rules. The 3 Verbal Triage rules can include the following rules, for example.

Rule 1: If a caller is both a cosigner and borrower on service loans based on Authentication lookup: identify if the caller is calling regarding the loan(s) he or she cosigned or the loan(s) he or she borrowed.

Rule 2: If a caller is calling regarding servicing the loan and he or she has a Department of Education serviced loan, play the following questions: If caller has combined Service and Education loans, present the caller with a question to identify if the caller is calling in regarding the Department of Education loan. If yes, route the caller to Department of Education channel. If no, then handle the call accordingly.

Rule 3: If the caller is calling regarding a new loan, transfer the caller to the appropriate department.

The Triage module can examine a combination of up to 19 different consumer-level and loan-level attributes in some embodiments. For example, see Table 8.

TABLE 8

| Identifier | Variable/Attribute | Identification Point in Flow | Attribute Level |
|---|---|---|---|
| 36 | Ed Flag | Alarms/Filters | Consumer |
| 49 | 1st Disbursement amount | Triage by Channel | Loan |

TABLE 8-continued

| Identifier | Variable/Attribute | Identification Point in Flow | Attribute Level |
|---|---|---|---|
| 50 | 1st Disbursement Date | Triage by Channel | Loan |
| 54 | Current Status Code | Alarms/Filters | Loan |
| 68 | Loan Application (Approved) Amount | Triage by Channel | Loan |
| 69 | Route Consumer Flag | Alarms/Filters | Loan |
| 70 | Loan Program(S) | Alarms/Filters | Loan |
| 71 | Loan Product | Alarms/Filters | Loan |
| 86 | Document Receipt Date | Triage by Channel | Loan |
| 87 | Document Received Type | Triage by Channel | Loan |
| 88 | CTA Triggers | Alarms/Filters | Loan |
| 105 | Loan ID Field | Alarms/Filters | Loan |
| 110 | Past Due Amount | Strategy Table | Loan |
| 115 | Consumer Loan Role | Alarms/Filters | Consumer |
| 118 | Commercial Flag | Alarms/Filters | Consumer |
| 120 | Disbursement Status Indicator | Triage by Channel | Disbursement |
| 121 | Disbursement Sequence Number | Triage by Channel | Disbursement |
| 126 | Pending Disbursement Amount | Triage by Channel | Disbursement |
| 127 | Next Disbursement Date | Triage by Channel | Disbursement |

One or many of these attributes can be grouped together to create a "triage-rule", which may be a feature available through the web-based user interface. If a triage-rule is matched, then a channel can be set and the caller can be sent to the Strategy Module, the caller can be directed to a specific submenu, or the caller can be prompted for additional clarification (Verbal Triage). Similar to the Alarms and Filters Module, Triage Module questions can be separated by channels. The triage conditions associated with the channel, and the IVR set for the caller, can be examined and evaluated. Also, if an attribute is not set (e.g., does not have at least one value assigned), then the attribute is disregarded and not considered part of the triage rule. For example, the following rules can created through the GUI:

TABLE 9

| TRIAGE_ID | CHANNEL | CTA_TRIGGER | LOAN_STATUS | LOAN_ROLE | PRIORITY | Action |
|---|---|---|---|---|---|---|
| 1 | DOE | MI91 GIA9 | AWAR | CONSUMER | 1 | SVC |
| 2 | SVC | GIB8 | ATEL | BORROWER | 2 | PAYMENTS |
| 3 | DOE | | | BOTH | 3 | VERBAL2 |

EXAMPLE 1

If a customer with the following information calls the IVR:

| CHANNEL = | DOE |
| CTA_TRIGGER = | MI91 |
| LOAN_STATUS = | AWAR |
| LOAN_ROLE = | CONSUMER | then Triage_ID 1 matches, and the caller's channel is set to SVC and proceeds to the Strategy Engine.

EXAMPLE 2

If a customer with the following information calls the IVR:

| CHANNEL = | SVC |
| CTA_TRIGGER = | BIB8 |
| LOAN_STATUS = | ATEL |
| LOAN_ROLE = | BORROWER | then Triage_ID 2 matches, and the caller is sent directly to the PAYMENTS menu.

EXAMPLE 3

If a customer with the following information calls the IVR:

| CHANNEL = | DOE |
| CTA_TRIGGER = | BIB8 |
| LOAN_STATUS = | ATEL |
| LOAN_ROLE = | Cosigner Loan + Borrower Loan identified | then Triage_ID 3 matches, and the caller is played VERBAL question #2, which may be: If a caller is both a cosigner and borrower on serviced loans, based on Authentication lookup, identify if the caller is calling regarding the loan(s) that he or she cosigned or the loan(s) for which he or she is the borrower.

Strategy Module

The Strategy Module can determine which informative messages are played to the caller (e.g., up to 2 messages), as well as which main menu options the caller will be presented. Similar to the Alarms and Filters Module, several consumer-level and loan-level attributes can be examined to determine what is most applicable to the caller, thus driving menu offerings. Instead of returning transfer destinations, which was the purpose of the Alarms and Filters Module, the Strategy Engine Module can return the menu options to play back to the caller.

The master transfer table can allow business units to setup one default strategy for each of the incoming Domain Name Identification Service (DNIS) values. Each of the incoming TFN's may have a default channel. However, the default strategy may be associated with the DNIS and not the channel.

The Strategy Engine may examine a combination of up to 62 different consumer-level and loan-level attributes in some embodiments. See Table 10 below.

TABLE 10

| 1 | Inward Channel - number customer called (APN) | Header | Call |
|---|---|---|---|
| 2 | ANI | Header | Call |
| 4 | # of Loans | Strategy Table | Consumer |

TABLE 10-continued

| | | | |
|---|---|---|---|
| 14 | Email Address Valid Flag | Strategy Table | Consumer |
| 16 | Fraud Flag | Alarms/Filters | Consumer |
| 20 | Cell Phone Permission Flag | Strategy Table | Consumer |
| 21 | Home Phone Permission Flag | Strategy Table | Consumer |
| 22 | Work Phone Permission Flag | Strategy Table | Consumer |
| 23 | Security Validation Info | Header | Call |
| 24 | Outstanding Balance | Strategy Table | Consumer |
| 28 | Current Amount Due | Strategy Table | Bill Group |
| 29 | Current Amount Due Date | Strategy Table | Bill Group |
| 33 | Current Delinquency Flag | Strategy Table | Loan |
| 36 | Ed Flag | Alarms/Filters | Consumer |
| 37 | Litigation Flag | Alarms/Filters | Consumer |
| 38 | Default/Claim/Charge Off Flag | Strategy Table | Consumer |
| 39 | School ID | Strategy Table | Loan |
| 43 | Accrued Interest Amount | Strategy Table | Consumer |
| 46 | Accrued Late Fee Amount | Strategy Table | Consumer |
| 48 | Payoff Amount (10 Day) | Strategy Table | Loan |
| 49 | 1st Disbursement Amount | Triage by Channel | Loan |
| 50 | 1st Disbursement Date | Triage by Channel | Loan |
| 51 | Last Disbursement Amount | Strategy Table | Loan |
| 52 | Last Disbursement Date | Strategy Table | Loan |
| 53 | First Payment Due Date | Strategy Table | Loan |
| 54 | Current Status Code | Alarms/Filters | Loan |
| 59 | Interest Rate | Strategy Table | Loan |
| 61 | Electronic Bill Code | Strategy Table | Loan |
| 62 | Auto Debit | Strategy Table | Consumer |
| 68 | Loan Application (Approved) Amount | Triage by Channel | Loan |
| 69 | Route Consumer Flag | Alarms/Filters | Loan |
| 70 | Loan Program(s) | Alarms/Filters | Loan |
| 71 | Loan Product | Alarms/Filters | Loan |
| 78 | LAD Accept Start Date | Strategy Table | |
| 86 | Document Receipt Date | Triage by Channel | Loan |
| 87 | Document Received Type | Triage by Channel | Loan |
| 88 | CTA Triggers | Alarms/Filters | Loan |
| 95 | Guarantor Code | Alarms/Filters | Loan |
| 96 | Disability Indicator | Alarms/Filters | Consumer |
| 97 | Valid ADDR | Alarms/Filters | Consumer |
| 99 | Days Delinquent | Alarms/Filters | Loan |
| 100 | Valid Phone | Alarms/Filters | Consumer |
| 102 | FDR Flag | Strategy Table | Consumer |
| 103 | Loan Curable/Incurable Flag | Alarms/Filters | Loan |
| 107 | Lender Code | Alarms/Filters | Loan |
| 108 | Previous Lender Code | Alarms/Filters | Loan |
| 110 | Past Due Amount | Strategy Table | Loan |
| 111 | Current Status Code Start Date | Strategy Table | Loan |
| 112 | Current Status Code End Date | Strategy Table | Loan |
| 113 | School Separation Date | Strategy Table | Consumer |
| 114 | Repayment Begin Date | Strategy Table | Loan |
| 116 | Recv Non - Regulatory Servicing Comm Via Email | Strategy Table | Consumer |
| 117 | Recv Regulatory Servicing Comm Email | Strategy Table | Consumer |
| 118 | Commercial Flag | Alarms/Filters | Consumer |
| 120 | Disbursement Status Indicator | Triage by Channel | Disbursement |
| 121 | Disbursement Sequence Number | Triage by Channel | Disbursement |
| 122 | LAD Revision # (fast track to sub menu) | Strategy Table | Loan |
| 123 | Date of Inbound Call | Strategy Table | Call |
| 124 | Pending Strata Field Variable | Alarms/Filters | Consumer |
| 132 | DTD Code | Strategy Table | Loan |
| 133 | # of Bill Groups | Strategy Table | Consumer |
| 134 | Bill Group ID | Strategy Table | Bill Group |

One or more of these attributes can be grouped together to create a "strategy", which may be a feature available through the web-based user interface. A "Strategy Description" field can be available in order to uniquely label each strategy. Furthermore, each strategy can have up to two informational messages, as well as a pipe delimited string containing all of the menu options to be played in case a strategy is matched.

Moreover, each strategy can be prioritized by importance, with priority number "1" having the highest possible priority. At the time of the call, a caller's consumer-level and loan-level information can be compared to the strategies created by the business units. If a strategy matches, then the caller hears the informational message (if it is set) followed by the menu options. Only one strategy may be required to drive caller experience, and as soon as the IVR detects a matched strategy, the strategy module is exited. Similar to the Alarms and Filters Module, as well as the Triage Module, each strategy may be associated with one channel, and at the time of execution, the strategies associated with the caller's set channel may be examined and evaluated.

Also, if an attribute is not set (e.g., does not have at least one value assigned), then the attribute is disregarded and not considered part of the strategy. For example, the following strategy can be created through the GUI:

TABLE 11

| STRATEGY ID | CHANNEL | SCHOOL_ID | LOAN_PRODUCT | INFO_MSG1 | PRIORITY | MENUS |
|---|---|---|---|---|---|---|
| 1 | DOE | USC OSU | 234 | Citizen.wav | 1 | Payment\|PIN Reset\|Loan Status\|Agent |

If a caller calls in on the Department of Education channel, and has a school identifier of either USC or OSU, and has a loan product ID of 234, then the caller can hear the following:

Citizen.wav (info message)
For Payment Information, press or say 1
To reset your PIN, press or say 2
To check on the status of your loan, press or say 3
To speak with an agent, press or say 4

It should be appreciated that the above is an example and the final verbiage and/or behavior may not be represented in this exact manner.

Transfer Override Module

The Transfer Override Module may be configured to allow an end-user to override any and all destination of the IVR system by examining a set of consumer-level attributes and loan-level attributes. The Transfer Override Module may function similar to the Alarms and Filters Module, Triage Module, and Strategy Module. Specific attributes are configured to serve as inputs to the Transfer Override Module, which outputs a destination skill if a match is identified. If the Module does not return a skill, the IVR system can utilize the default skill established in a master transfer table.

Figure 2:
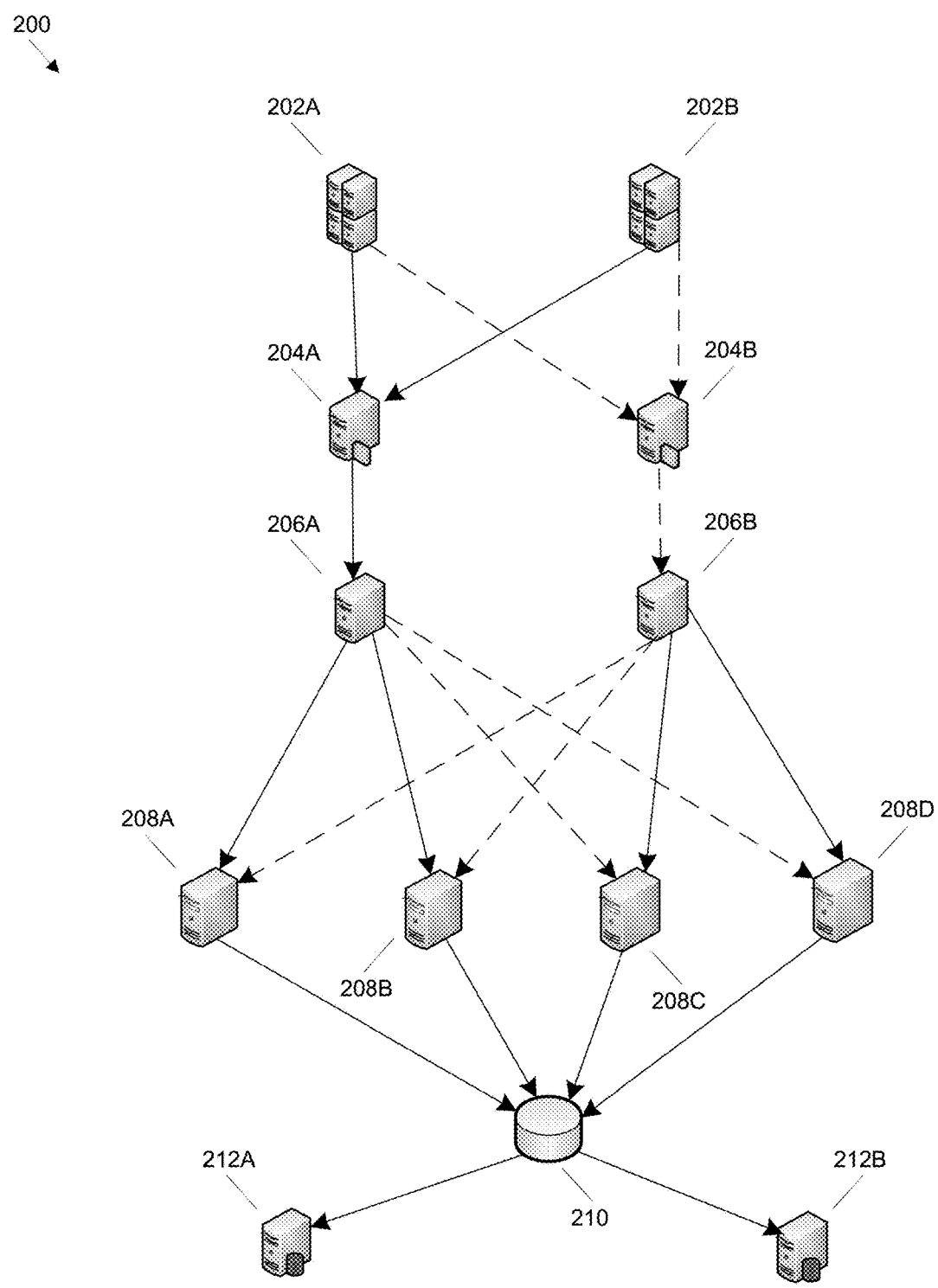
FIG. 2 illustrates a system, in accordance with an embodiment of the present invention.

FIG. 2 illustrates a system 200, in accordance with an embodiment of the present invention. In this embodiment, FIG. 2 illustrates a diagram that represents web service transactions initiated by parties 202A, 202B, such as Sallie Mae® servers, and the transactions may be transmitted through dedicated circuits 204A, 204B, such as West® Interactive circuits.

It should be appreciated that transactions may be HyperText Transfer Protocol Secure (HTTPS) over port 443 (e.g., fire and forget). The transactions may be transmitted through a private perimeter network (or DMZ) and into productions F5 206A, 206B. Productions F5 206A, 206B may be Omaha productions. From there, the transaction can be load balanced across four different virtual machines 208A, 208B, 208C, 208D hosting the web service.

The transactions are then passed to a HyperText Preprocessor PHP Data Objects (PDO) connection pool 210 with a persistent connection to databases 212A, 212B. Connection Pool 210 can then connect to, for example, an Informix Connection Manager (not listed), which can then perform load balancing between databases 212A, 212B.

Figure 3:
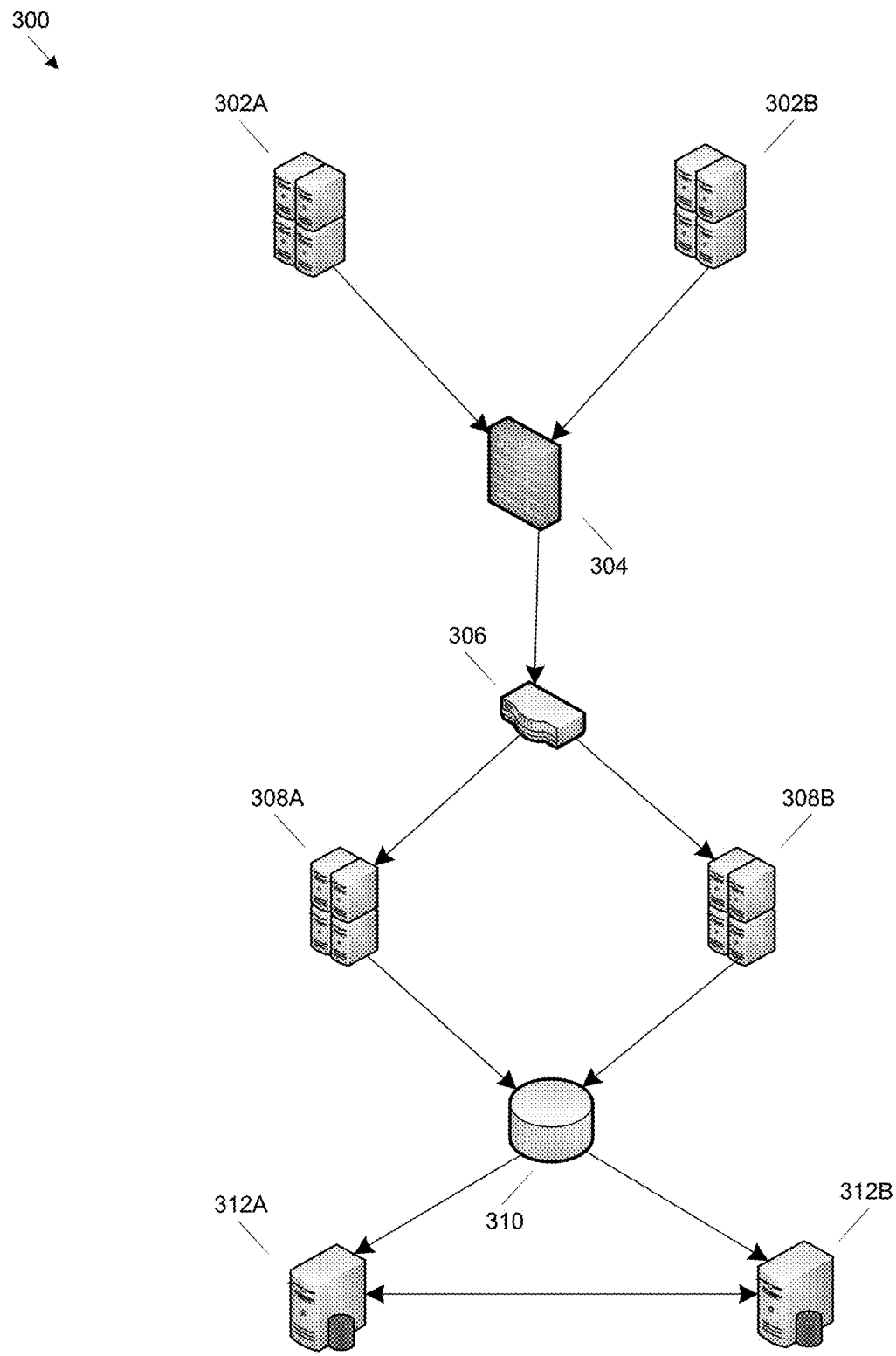
FIG. 3 illustrates a system, in accordance with an embodiment of the present invention.

FIG. 3 illustrates a system 300, in accordance with an embodiment of the present invention. In this embodiment, FIG. 3 illustrates transactions initiated by Web Farms 302A, 302B that pass through a dedicated firewall 304.

Similar to FIG. 2, transactions may be HTTPS over port 443 (e.g., fire and forget), and sent through a private DMZ into a production 306. The transactions may then be load balanced across servers 308A, 308B hosting web services. From servers 308A, 308B, the transactions are passed to a connection pool 310 with a persistent connection to databases 312A, 312B. In this example, transactions may not be fire and forget and a response may be expected by Web Farms 302A, 302B to satisfy the needs of the decision engine user interface.

Figure 4:
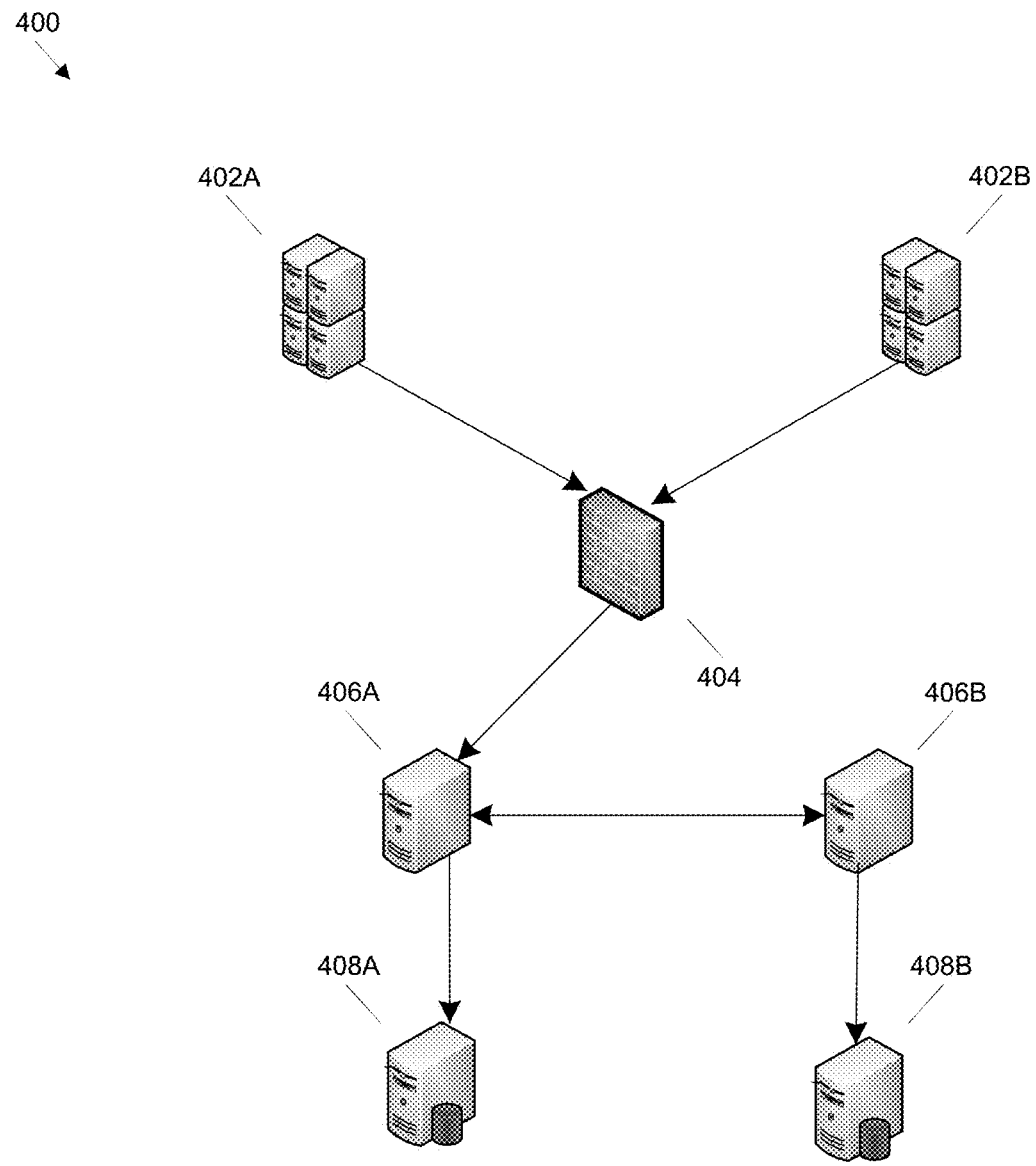
FIG. 4 illustrates a system, in accordance with an embodiment of the present invention.

FIG. 4 illustrates a system 400, in accordance with an embodiment of the present invention. In this embodiment, logs can be fetched off servers 402A, 402B (or sent from servers 402A, 402B) to processor boxes 406A, 406B, via firewall 404. In this example, processor box 406B may handle batch transactions and may sync its data with processor box 406A. It should also be noted that the loads of databases 408A, 408B may run concurrently on each processor box 406A, 406B.

Figure 5:
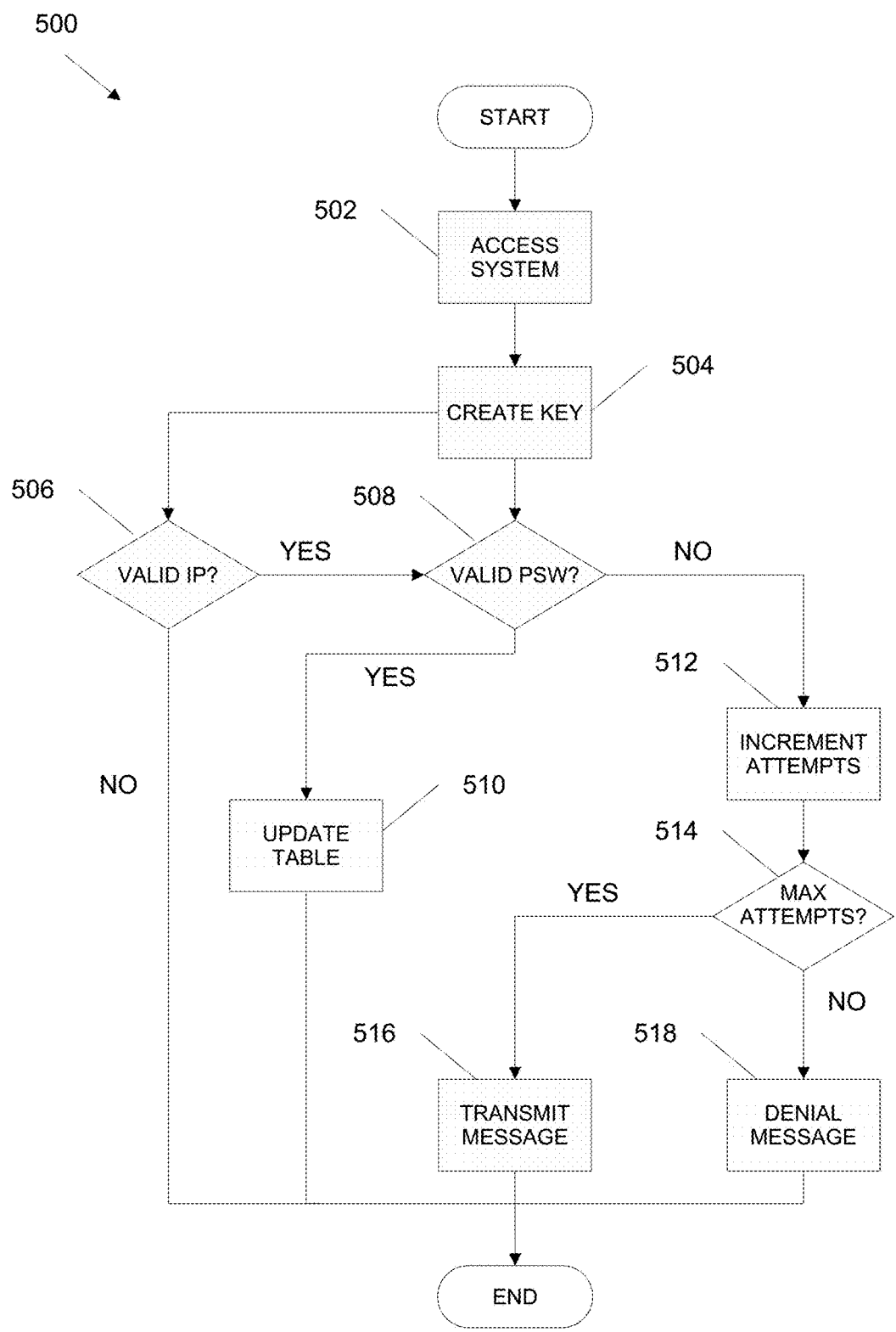
FIG. 5 illustrates a method for user authentication, in accordance with an embodiment of the present invention.

FIG. 5 illustrates a method 500 for authentication, in accordance with an embodiment of the present invention. At 502, a user accesses the system by entering his or her user name and password and, at 504, a user encryption key is created. At 506, the server begins the authentication process by determining whether the Internet Protocol (IP) address for the user and the IP address for the server are valid. To make such a determination, an IP table is queried. The IP table can include the valid IP address for each user and the IP address for the server.

If the IP address for the user and the IP address for the server are not valid, then the process ends. If the IP address for the user and the IP address for the server are valid, then the server, at 508, determines whether the user name and password are correct. To make such a determination, the server queries a user table database to look up the user name and password.

If the user name and password are correct, then the server, at 510, updates the user table database to reset the number of attempts by the user to 0. If the user name and password are incorrect, then the server, at 512, increments the attempts by 1.

The server also checks to determine whether the user has exceeded the number of attempts at 514. If the user has exceeded the number of attempts, then the server transmits an account locked out message at 516. Otherwise, the server sends a denial message at 518 requesting the user to try again.

Figure 6:
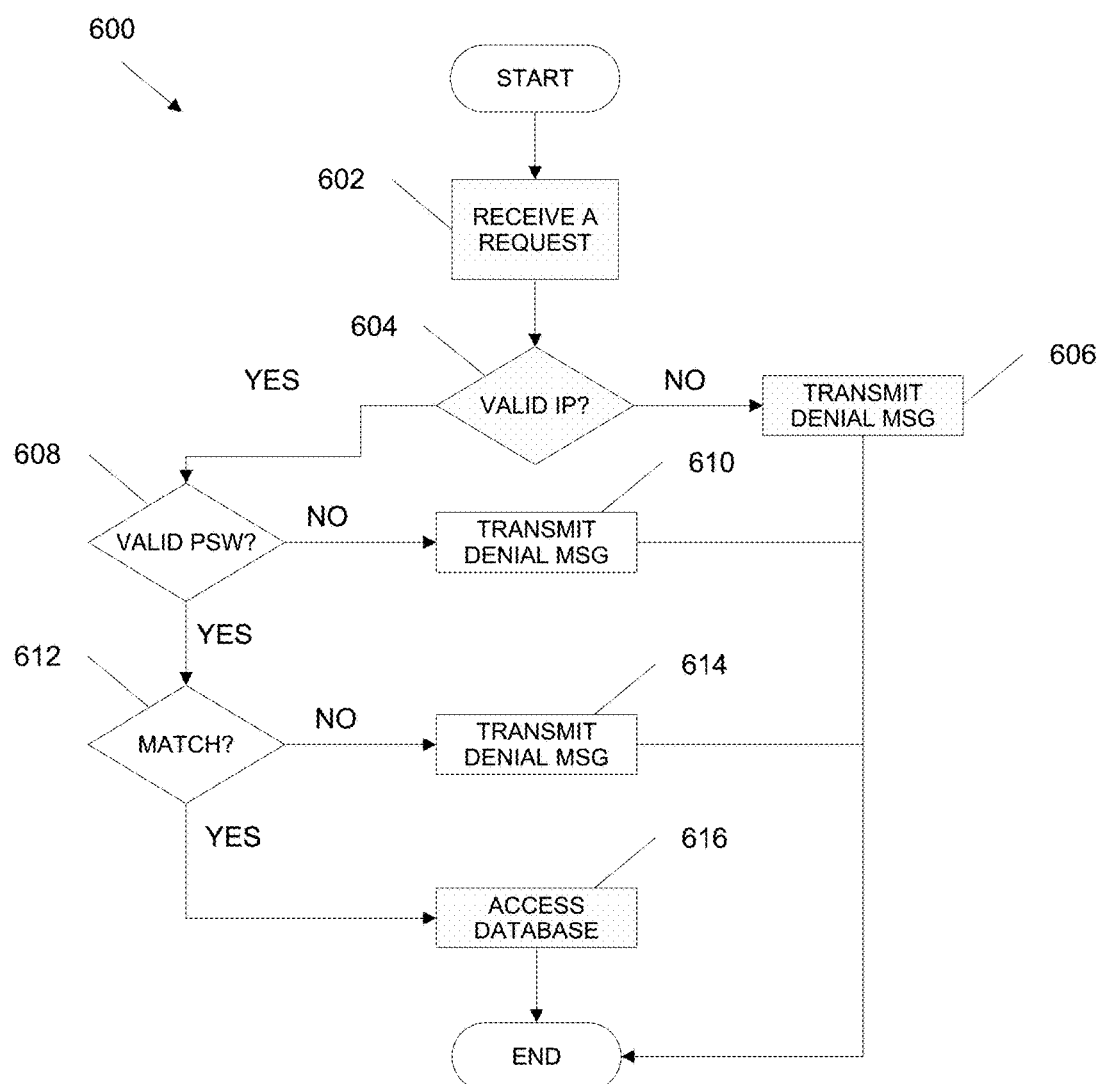
FIG. 6 illustrates a method for authorizing a user, in accordance with an embodiment of the present invention.

FIG. 6 illustrates a method 600 for authorizing a user, in accordance with an embodiment of the present invention. A request is received from a system at a server to authorize a user at 602. The request may include the IP address of the user and the IP address of the web server encrypted key. The server determines whether the IP address of user and the IP address of the web server are valid at 604. To make this determination, an IP table database is queried. The IP table database can include the IP addresses of each user and the IP addresses of the web server.

If the IP address of the user and web server is not valid, then a denial message is transmitted to the user at 606. However, if the IP address of the user and web server are valid, then a permissions table database is queried to determine whether the user has permission to access, for example, the strategy module at 608.

If the user does not have permission, then a denial message is sent at 610 to the user. However, if the user has permission, then the user table database is accessed to determine whether the encrypted key matches at 612. If the user encryption key does not match, then a denial message is transmitted to the user at 614. If the encryption key does match, then the strategy decision database is accessed at 616.

Figure 7:
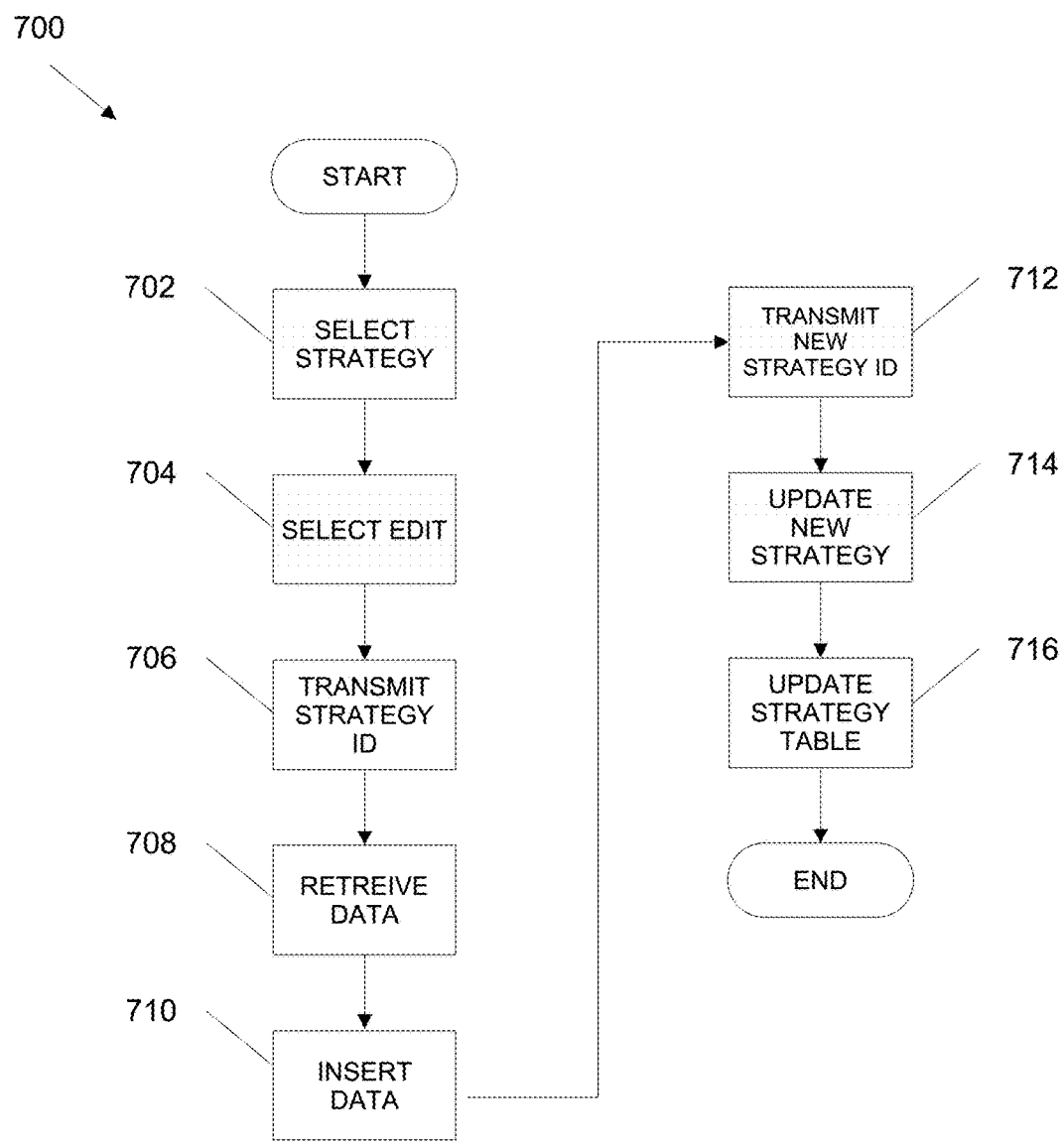
FIG. 7 illustrates a method for updating a strategy, in accordance with an embodiment of the present invention.

FIG. 7 illustrates a method 700 for updating a strategy, in accordance with an embodiment of the present invention. In this embodiment, the user selects a strategy to update at 702, and selects edit in order to modify the strategy at 704. At 706, a strategy identification (ID) is passed (or transmitted) to a web service. For example, the strategy ID is passed to the web service and the web service saves the strategy ID in the memory as an old strategy ID.

The web service pulls (or retrieves) all strategy data and attributes for the selected strategy at 708. For example, the strategy data and attributes are retrieved from a loan database that contains information for the selected strategy. At 710, the web service inserts the strategy data and attributes into the loan database and creates a new strategy ID for the inserted data and attributes. At 712, the new strategy ID is transmitted to the user so the user can update the strategy.

The user then performs the updates against the new strategy ID at 714 and saves the updated strategy ID. The web service then updates the strategy table at 716. For example, the web service sets the new strategy ID status to activate and the old strategy ID to disabled (or inactive).

Figure 8:
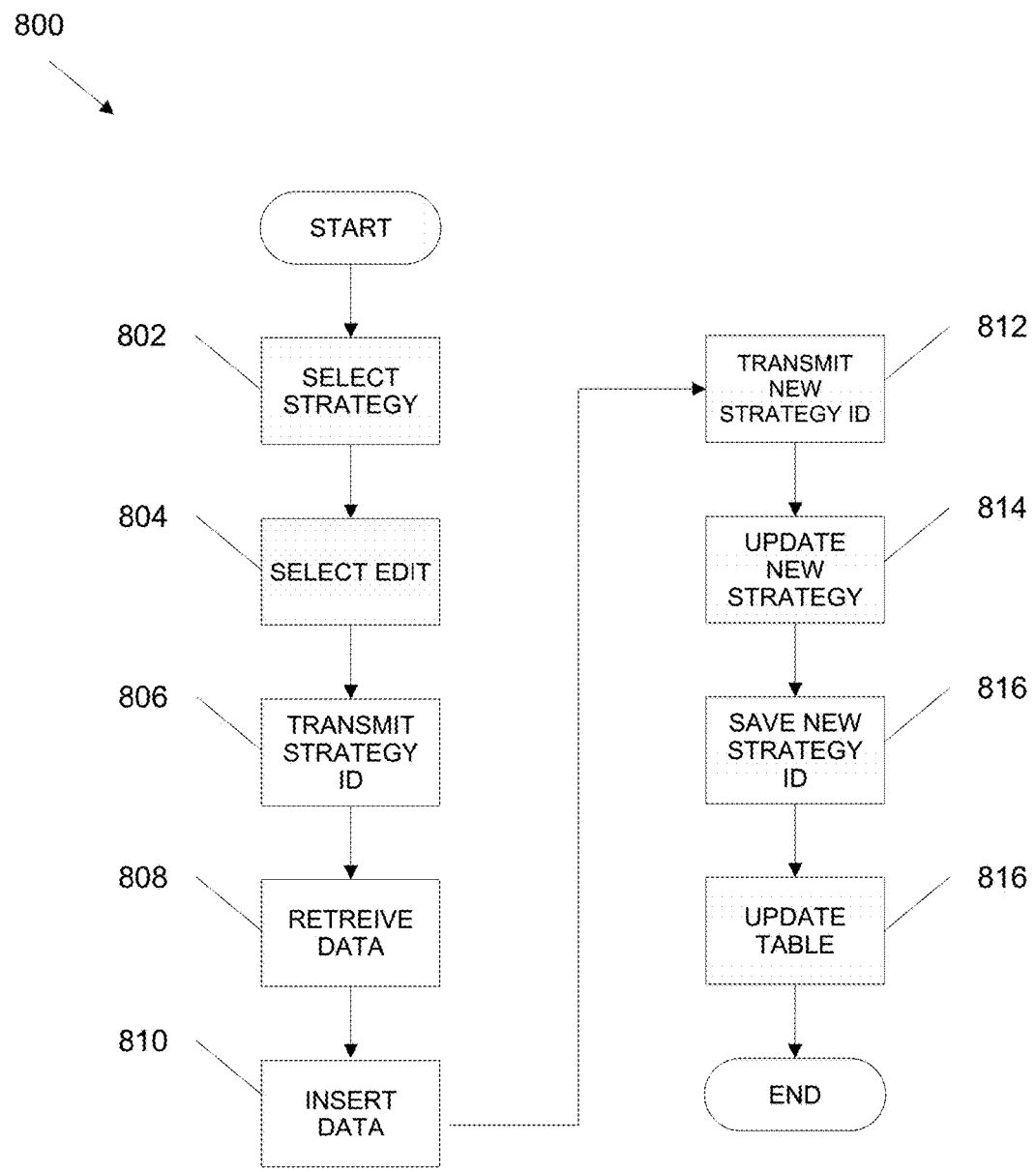
FIG. 8 illustrates a method for updating attributes for a strategy, in accordance with an embodiment of the present invention.

FIG. 8 illustrates a method 800 for updating attributes for a strategy, in accordance with an embodiment of the present invention. In this embodiment, the user selects the strategy at 802 and selects edit in order to modify or update the attributes of the strategy at 804. The strategy ID is transmitted to a web service at 806. For example, when the web service receives the strategy ID, the web service saves the strategy ID as an old strategy ID in the memory.

At 808, the web service pulls (or retrieves) all strategy data and attributes from the loan database in order to edit the attributes of the selected strategy. At 810, the web service inserts the strategy and the attributes of the strategy back into the loan database under a new strategy ID. At 812, the new strategy is transmitted to the user with the new strategy ID and the user performs the updates to the strategy at 814. It should be appreciated that the new strategy ID should be used until the overlay window is closed or the new strategy ID is greater than 10 minutes old in some embodiments.

When the user finishes updating the attributes associated with the new strategy ID, the user saves the new strategy ID at 816. At 818, the web service receives the updates from the user and updates the strategy table in the loan database. For example, the web service updates the strategy table by setting the old strategy ID as disabled (or inactive) and the new strategy ID as active.

Figure 9:
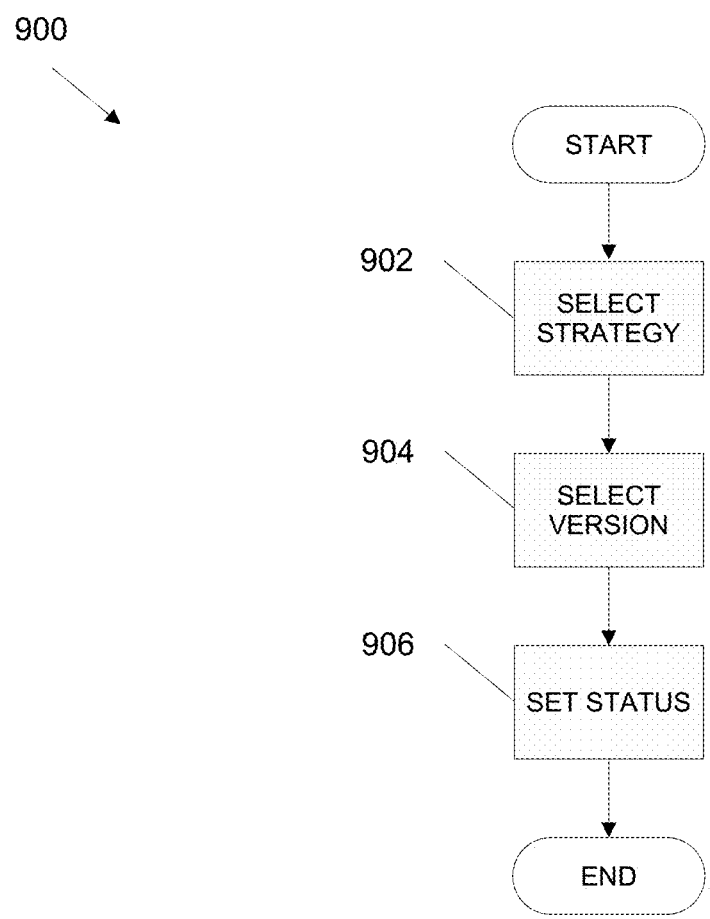
FIG. 9 illustrates a method for selecting a strategy to rollback, in accordance with an embodiment of the present invention.

FIG. 9 illustrates a method 900 for selecting a strategy to rollback, in accordance with an embodiment of the present invention. In this embodiment, the user selects a strategy to roll back at 902. At 904, the user selects the version of the strategy to rollback. The web service may show up to 30 days of revisions to the user for the selected strategy in some embodiments. In other embodiments, more than 30 days of revisions can be shown. It should also be appreciated that the user can view all of the attributes and versions of the selected strategy. Once the user selects the version of the strategy to rollback, the web service sets (or rolls back) the current active strategy status to disabled (or "D") at 906 and sets the selected strategy version to active (or "A"). It should be noted that the selected strategy version that is set to active could be any strategy version that the user selects or the previous version depending on the configuration of the system.

The method steps shown in FIGS. 5-9 may be performed, in part, by a computer program, encoding instructions for a nonlinear adaptive processor to cause at least the methods described in FIGS. 5-9 to be performed by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the method described in FIGS. 5-9, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
receiving an incoming call from a consumer at an interactive voice response system;
comparing available data metrics based at least on attributes of the incoming call to rules, and
routing the incoming call based on the comparison of the available data metrics with the rules and a consumer selection from a self-service menu generated from consumer-level and account-level data elements,
wherein a plurality of combinations of consumer-level and loan-level attributes are grouped as strategies and wherein informational messages are played upon positive matching of the strategies with business unit strategies.

2. The computer-implemented method of claim 1, further comprising:
routing the consumer to a specific agent destination when the consumer is associated with a bad status flag.

3. The computer-implemented method of claim 2, further comprising:
determining whether the consumer is associated with the bad status flag based on an examination of consumer-level attributes and loan-level attributes that are associated with the consumer.

4. The computer-implemented method of claim 1, further comprising:
determining a reason for the incoming call from the consumer based on an examination of non-verbal triage and verbal triage.

5. The computer-implemented method of claim 4, wherein the examination of the non-verbal triage comprises:
examining consumer-level attributes and loan-level attributes associated with the consumer and determining a channel to set for the consumer.

6. The computer-implemented method of claim 5, further comprising:
directing a caller to a submenu of the interactive voice response system or to an appropriate destination.

7. The computer-implemented method of claim 4, wherein the examination of the verbal triage comprises:
prompting the consumer for additional information based on an examination of a profile of the consumer.

8. The computer-implemented method of claim 1, further comprising:
determining which messages to play to the consumer and which menu options to present to the consumer.

9. The computer-implemented method of claim 8, further comprising:
examining consumer-level attributes and loan-level attributes associated with the consumer to determine the messages to play and the menu options to present.

10. The computer-implemented method of claim 8, further comprising:
generating appropriate messages to play and appropriate menu options to address the needs of the consumer.

11. An apparatus, comprising:
a processor; and
memory comprising a set of instructions,
wherein the set of instructions is configured to cause the processor to
receive an incoming call from a consumer at an interactive voice response system;
compare available data metrics based at least on attributes of the incoming call to rules, and
route the incoming call based on the comparison of the available data metrics with the rules and a consumer selection from a self-service menu generated from consumer-level and account-level data elements,
wherein a plurality of combinations of consumer-level and loan-level attributes are grouped as strategies and wherein informational messages are played upon positive matching of the strategies with business unit strategies.

12. The apparatus of claim 11, wherein the set of instructions is further configured to cause the processor to:
route the consumer to a specific agent destination when the consumer is associated with a bad status flag.

13. The apparatus of claim 12, wherein the set of instructions is further configured to cause the processor to:
determine whether the consumer is associated with the bad status flag based on an examination of consumer-level attributes and loan-level attributes that are associated with the consumer.

14. The apparatus of claim 11, wherein the set of instructions is further configured to cause the processor to:
determine a reason for the incoming call from the consumer based on an examination of non-verbal triage and verbal triage.

15. The apparatus of claim 14, wherein the set of instructions is further configured to cause the processor to:
when examining the non-verbal triage, examine consumer-level attributes and loan-level attributes associated with the consumer and determining a channel to set for the consumer.

16. The apparatus of claim 15, wherein the set of instructions is further configured to cause the processor to:
direct a caller to a submenu of the interactive voice response system or to an appropriate destination.

17. The apparatus of claim 14, wherein the set of instructions is further configured to cause the processor to:
when examining the verbal triage, prompt the consumer for additional information based on an examination of a profile of the consumer.

18. The apparatus of claim 11, wherein the set of instructions is further configured to cause the processor to:
determine which messages to play to the consumer and which menu options to present to the consumer.

19. The apparatus of claim 18, wherein the set of instructions is further configured to cause the processor to:
examine consumer-level attributes and loan-level attributes associated with the consumer to determine the messages to play and the menu options to present.

20. The apparatus of claim 18, wherein the set of instructions is further configured to cause the processor to:
generate appropriate messages to play and appropriate menu options to address the needs of the consumer.

* * * * *